Feb. 26, 1935.  H. D. EYCLESHYMER  1,992,294
ANIMAL TRAP
Filed March 20, 1933
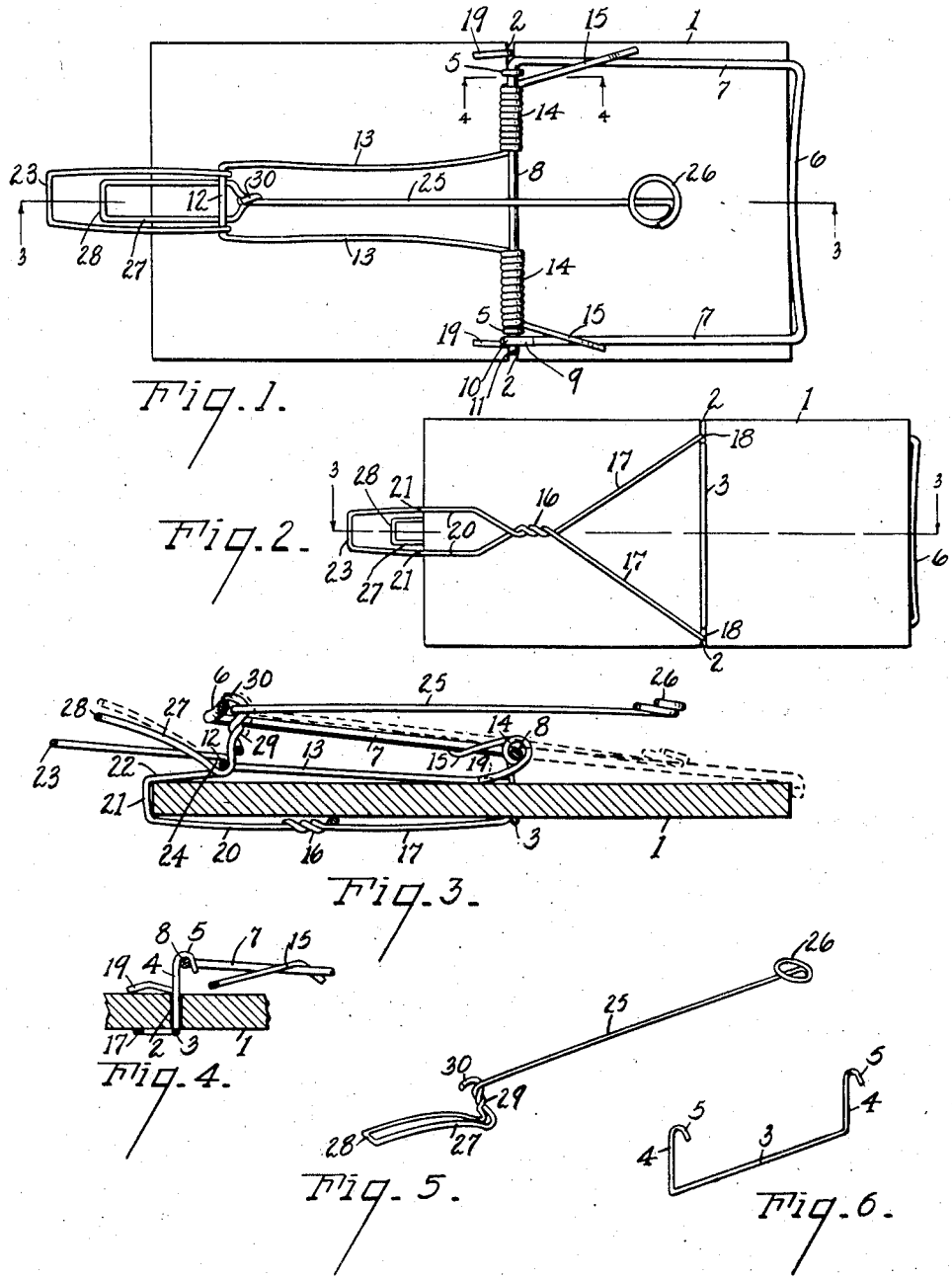
INVENTOR
Harold D. Eycleshymer
BY
Chappell Earl
ATTORNEYS Patented Feb. 26, 1935

1,992,294

UNITED STATES PATENT OFFICE 1,992,294

ANIMAL TRAP

Harold D. Eycleshymer, Niles, Mich.

Application March 20, 1933, Serial No. 661,807

6 Claims. (Cl. 43—81)

The main objects of this invention are:

First, to provide an animal trap of improved construction which is especially designed to catch mice, rats, and other rodents.

Second, to provide a trap of this character having a holder and fingerpiece adapted to positively hold the trigger or tripping lever in locked position while the trap is being set and placed.

Third, to provide a simple and efficient trap of this character which may be manufactured at low cost and may be assembled by unskilled workers.

Fourth, to provide a trap having the above desirable features and advantages and which can be easily set without the possibility of injury to the fingers and is effective and efficient in operation.

Objects relating to details and economies of my invention will appear from the description to follow. The invention is defined and pointed out in the claims.

A structure which is a preferred embodiment of my invention is illustrated in the accompanying drawing, in which:

Fig. 1 is a top plan view of an animal trap embodying the features of my invention, with the parts in sprung position.

Fig. 2 is a reduced bottom plan view.

Fig. 3 is a longitudinal vertical section on a line corresponding to line 3—3 of Figs. 1 and 2, the parts being shown in set position by full lines and in sprung position by dotted lines.

Fig. 4 is a fragmentary detail section on line 4—4 of Fig. 1.

Fig. 5 is a perspective view of the trigger or tripping lever.

Fig. 6 is a perspective view of the jaw bearing member.

Referring to the structure illustrated by the drawing, 1 is a base of any suitable material such as wood having a pair of opposed side slots 2. A wire cross rod 3 is disposed under the base and has end uprights 4 extending through the slots 2 and terminating in downwardly facing open hook-like eyes 5.

The rectangular wire jaw 6 has side arms 7 and a cross spindle 8 journaled to the eyes 5. The jaw consists of a single piece of wire bent into rectangular form, the end 9 of one of the arms 7 being bent back on itself to provide an eye 10 receiving the end 11 of the cross shaft 8. In assembly, when the end 11 of the pintle or pivot 8 is arranged through the eye 10 it is not necessary to swedge or bend the end 11 or to perform any mechanical operation in order to keep it in position.

The wire cross fulcrum 12 has forwardly extending side members 13 terminating in spaced spring coils 14 on the pintle 8. The outer ends 15 of the coils are hooked over the side arms 7 of the jaw. The spring coils 14 act to urge the fulcrum 12 and jaw 6 toward the base, causing the latter to urge the shaft 8 upwardly into engagement with the hook-like eyes 5 thereby holding the parts in assembled relation.

A wire frame 16 is disposed under the base and has forwardly diverging arms 17 provided with end uprights 18 extending through the slots 2 and terminating in rearwardly extending ends 19 overlapping the base. The frame also has a rearwardly extending loop 20 provided with uprights 21 at the rear end of the base, side portions 22 overlapping the base and a rearwardly extending loop-like handle or holder 23 projecting rearwardly of the base.

The cross fulcrum 12 is arranged in the spaced rearwardly facing crotches 24 formed by the side portions 22 with the handle or holder 23. Thus, the frame 16 provides a support for the fulcrum 12 and acts to hold it in assembled relation with the base.

The wire tripping lever or trigger 25 is coiled at its front end to provide the bait support or holder 26. At its rear end, the tripping lever is provided with a loop 27 arranged under the fulcrum 12 and extending upwardly therefrom at the rear to provide a fingerpiece 28 and at the front to provide a twisted shank 29 ending in an overhanging tongue 30 adapted to engage the jaw 6 when the trap is set. When the handle or holder 23 and the fingerpiece 28 are grasped between the forefinger and thumb, the fingerpiece acts to positively hold the tripping lever in locked position. Thus, the trap may be set and placed in any desired position without danger of injuring the fingers of the operator. Furthermore, the trap may be moved while set from one position to another by means of the holder and fingerpiece without danger and without the necessity of resetting the trap.

My improved animal trap has only five parts besides the base. Such five parts can be made by automatic machines taking the wire direct from the coil. The parts are assembled by first placing the open end of the pivot 8 of the jaw through the spring coils and then through the eye 10 of the side arm 7; second, placing the cross rod 3 under the base with the uprights 4 in the slots 2 and with the eyes 5 facing forwardly; third, placing the frame 16 in position by sliding it forwardly over the rear end of the base until the uprights 18 spring into the slots 2; fourth, hooking the cross fulcrum 12 in the spaced crotching 24 of the frame 16 and pressing the shaft 8 of the jaw downward over the staples 5 until the shaft clears the ends of the hooks and snaps into position; fifth, placing the loop 27 of the trigger or tripping lever 25 in position under the cross fulcrum 12.

It will be observed that the parts are easily and readily assembled. The double safety grip provided by the holder 23 and fingerpiece 28 makes it practically impossible to catch the fingers when setting or placing the trap. Such double grip positively holds the trigger in locked position in handling the trap. I believe that this alone is a very important feature in my trap.

I claim:

1. An animal trap comprising a base having a pair of opposed side slots, a wire cross rod disposed under said base and having end uprights extending through said slots and terminating in downwardly facing hook-like eyes, a rectangular wire jaw having side arms and a pivot journaled to said eyes, a wire cross fulcrum having forwardly extending side members terminating in a pair of spaced spring coils on said pivot, the outer ends of the coils being hooked over said side arms, a wire frame disposed under said base and having forwardly diverging members provided with end uprights extending through said slots and terminating in rearwardly extending ends overlapping said base, said frame having a rearwardly extending loop provided with uprights at the rear end of said base, forwardly extending side portions overlapping said base and a rearwardly extending loop-like holder projecting rearwardly of the jaw in set position, said cross fulcrum being arranged in the spaced rearwardly facing crotches formed by said side portions with said holder, and a wire tripping lever having at its front end a bait support and at its rear end a loop arranged under said cross fulcrum and extending upwardly therefrom at the rear to provide a fingerpiece and upwardly at the front of the fulcrum to provide a twisted shank ending in an overhanging tongue adapted to engage said jaw when the trap is set, said fingerpiece, when grasped with said holder, being adapted to positively hold the tripping lever in locked position while setting and placing the trap.

2. An animal trap comprising a base having a pair of opposed side slots, a cross rod disposed under said base and having end uprights extending through said slots and terminating in downwardly facing hook-like eyes, a rectangular jaw having side arms and a pivot journaled to said eyes, a cross fulcrum having forwardly extending side members terminating in a pair of spaced spring coils on said pivot, the outer ends of the coils being hooked over said side arms, a frame disposed under said base and having forwardly diverging members provided with end uprights extending through said slots and terminating in rearwardly extending ends overlapping said base, said frame having a rearwardly extending loop provided with uprights at the rear end of said base, forwardly extending side portions overlapping said base and a rearwardly extending loop-like holder projecting rearwardly of the jaw in set position, said cross fulcrum being arranged in the spaced rearwardly facing crotches formed by said side portions with said holder, and a tripping lever having at its front end a bait support and at its rear end a loop arranged under said cross fulcrum and extending upwardly therefrom at the rear to provide a fingerpiece and upwardly at the front of the fulcrum to provide a twisted shank ending in an overhanging tongue adapted to engage said jaw when the trap is set, said fingerpiece, when grasped with said holder, being adapted to positively hold the tripping lever in locked position.

3. An animal trap comprising a base having a pair of opposed side slots, a cross rod disposed under said base and having end uprights extending through said slots and terminating in downwardly facing hook-like eyes, a jaw having side arms and a pivot journaled to said eyes, a cross fulcrum having forwardly extending side members terminating in a pair of spaced spring coils on said pivot, the outer ends of the coils being hooked over said side arms, a frame disposed under said base and having a rearwardly extending loop provided with uprights at the rear end of said base, forwardly extending side portions overlapping said base and a rearwardly extending loop-like holder projecting rearwardly of the jaw in set position, said cross fulcrum being arranged in the spaced rearwardly facing crotches formed by said side portions with said holder, and a tripping lever having at its front end a bait support and at its rear end a loop arranged under said cross fulcrum and extending upwardly therefrom at the rear to provide a fingerpiece and upwardly at the front of the fulcrum to provide a twisted shank ending in an overhanging tongue adapted to engage said jaw when the trap is set, said fingerpiece, when grasped with said holder, being adapted to positively hold the tripping lever in locked position.

4. An animal trap comprising a base, uprights associated with said base and terminating in downwardly facing open eyes, a wire jaw having side arms and a pivot journaled to said eyes, a wire cross fulcrum having forwardly extending side members terminating in a pair of spaced spring coils on said pivot, the outer ends of the coils being hooked over said side arms, a wire frame disposed under said base and having a rearwardly extending loop provided with uprights at the rear end of said base, forwardly extending side portions overlapping said base and a rearwardly extending loop-like holder projecting rearwardly of the jaw in set position, said cross fulcrum being arranged in the spaced rearwardly facing crotches formed by said side portions with said holder, and a wire tripping lever having at its front end a bait support and at its rear end a loop arranged under said cross fulcrum and extending upwardly therefrom at the rear to provide a finger-piece and upwardly at the front of the fulcrum to provide a twisted shank ending in an overhanging tongue adapted to engage said jaw when the trap is set, said fingerpiece, when grasped with said holder, being adapted to positively hold the tripping lever in locked position.

5. An animal trap comprising a base, uprights associated with said base and terminating in downwardly facing open eyes, a wire jaw having side arms and a pivot journaled to said eyes, a frame disposed under said base and having a rearwardly extending loop provided with uprights at the rear end of said base, forwardly extending side portions overlapping said base and a rearwardly extending loop-like holder projecting back of the rear end of said jaw when in set position, a cross fulcrum in the spaced rearwardly facing crotches formed by said side portions with said holder, and a tripping lever having at its front end a bait support and at its rear end a loop arranged under said cross fulcrum and extending upwardly therefrom at the rear to provide a fingerpiece and upwardly at the front of the fulcrum to provide a twisted shank ending in an overhanging tongue adapted to engage said jaw when the trap is set, said fingerpiece, when grasped with said holder, being adapted to positively hold the tripping lever in locked position.

6. An animal trap comprising a base, a spring actuated jaw pivoted to said base, a wire frame having forwardly extending side portions overlapping said base and a rearwardly extending loop-like holder projecting back of the rear end of said jaw when in set position, spaced rearwardly facing crotches formed by said side portions with said holder, a cross fulcrum in said crotches, and a tripping lever having at its front end a bait support and at its rear end a loop arranged under said cross fulcrum and extending upwardly therefrom at the rear to provide a finger piece and upwardly therefrom at the front of the fulcrum to provide a twisted shank ending in an overhanging tongue adapted to engage said jaw when the trap is set, said fingerpiece, when grasped with said holder, being adapted to positively hold the tripping lever in locked position.

HAROLD D. EYCLESHYMER.